(12) United States Patent
Diab et al.

(10) Patent No.: US 8,184,539 B2
(45) Date of Patent: May 22, 2012

(54) METHOD AND SYSTEM FOR CONTROLLING A CLOCK FREQUENCY IN A NETWORK DEVICE BASED ON AGGREGATE THROUGHPUT OF THE DEVICE

(75) Inventors: Wael William Diab, San Francisco, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 345 days.

(21) Appl. No.: 12/200,551

(22) Filed: Aug. 28, 2008

(65) Prior Publication Data

US 2009/0154350 A1 Jun. 18, 2009

Related U.S. Application Data

(60) Provisional application No. 61/014,253, filed on Dec. 17, 2007, provisional application No. 61/014,265, filed on Dec. 17, 2007, provisional application No. 61/014,278, filed on Dec. 17, 2007, provisional application No. 61/014,293, filed on Dec. 17, 2007.

(51) Int. Cl.
*H04J 1/16* (2006.01)

(52) U.S. Cl. ......... 370/235; 370/230; 370/231; 370/232

(58) Field of Classification Search .................. 370/433, 370/229, 468, 230, 231, 232, 235
See application file for complete search history.

(56) References Cited

U.S. PATENT DOCUMENTS

| | | | | |
|---|---|---|---|---|
| 5,596,575 A | * | 1/1997 | Yang et al. | 370/468 |
| 5,784,559 A | * | 7/1998 | Frazier et al. | 370/522 |
| 5,883,894 A | * | 3/1999 | Patel et al. | 370/438 |
| 5,884,041 A | * | 3/1999 | Hurwitz | 709/228 |
| 5,907,553 A | * | 5/1999 | Kelly et al. | 370/433 |
| 5,923,663 A | * | 7/1999 | Bontemps et al. | 370/445 |
| 6,052,738 A | * | 4/2000 | Muller et al. | 709/250 |

(Continued)

FOREIGN PATENT DOCUMENTS

EP 1 473 870 11/2004

(Continued)

OTHER PUBLICATIONS

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

(Continued)

*Primary Examiner* — Ricky Ngo
*Assistant Examiner* — Dewanda Samuel
(74) *Attorney, Agent, or Firm* — Duane S. Kobayashi

(57) ABSTRACT

Aspects of a method and system for controlling a clock frequency in a network device based on aggregate throughput of the device are provided. In this regard, for a network device comprising one or more network ports, a limit on aggregate throughput of the device during a time interval may be determined and an operating frequency of a clock within the network device may be controlled based on the determined limit on aggregate throughput. The limit on aggregate throughput may be determined based on past, present, and/or expected traffic patterns; how many of the device's network ports are active during the time interval, a data rate at which each of the active network ports operates during the time interval; a type of data communicated via the network ports; and/or one or more applications running on the network device during the time interval.

48 Claims, 7 Drawing Sheets

Aggregate traffic on N-ports

U.S. PATENT DOCUMENTS

| | | | |
|---|---|---|---|
| 6,115,389 A * | 9/2000 | Mahale et al. | 370/442 |
| 6,222,825 B1 * | 4/2001 | Mangin et al. | 370/235 |
| 6,349,331 B1 * | 2/2002 | Andra et al. | 709/220 |
| 6,477,199 B1 * | 11/2002 | Agazzi et al. | 375/232 |
| 6,791,942 B2 * | 9/2004 | Jin | 370/229 |
| 6,795,450 B1 | 9/2004 | Mills et al. | |
| 6,856,597 B1 | 2/2005 | Scott | |
| 6,892,252 B2 * | 5/2005 | Tate | 710/30 |
| 6,952,399 B1 | 10/2005 | Bayerl | |
| 7,003,331 B2 | 2/2006 | Cromer | |
| 7,050,517 B1 | 5/2006 | Sallaway et al. | |
| 7,068,609 B2 * | 6/2006 | Huff | 370/252 |
| 7,072,997 B2 * | 7/2006 | Tate | 709/250 |
| 7,116,682 B1 | 10/2006 | Waclawsky | |
| 7,308,058 B2 | 12/2007 | Zerbe et al. | |
| 7,392,412 B1 * | 6/2008 | Lo | 713/320 |
| 7,539,887 B2 * | 5/2009 | Hsu et al. | 713/324 |
| 2002/0157030 A1 * | 10/2002 | Barker et al. | 713/320 |
| 2004/0218634 A1 * | 11/2004 | Peng et al. | 370/503 |
| 2005/0258856 A1 * | 11/2005 | Kishimoto et al. | 324/765 |
| 2006/0034295 A1 | 2/2006 | Cherukuri et al. | |
| 2007/0274348 A1 * | 11/2007 | Friedman et al. | 370/503 |
| 2007/0280239 A1 | 12/2007 | Lund | |
| 2007/0294433 A1 * | 12/2007 | Leigh | 709/250 |
| 2008/0225841 A1 | 9/2008 | Conway et al. | |
| 2009/0180529 A1 | 7/2009 | Agazzi et al. | |
| 2010/0142967 A1 * | 6/2010 | Perez | 398/135 |

FOREIGN PATENT DOCUMENTS

| | | |
|---|---|---|
| EP | 1484876 A1 | 12/2004 |
| EP | 1494407 A1 | 5/2005 |
| GB | 2337672 A | 11/1999 |
| WO | WO 00/31923 | 6/2000 |

OTHER PUBLICATIONS

Grow, "802.1 and Energy Efficient Ethernet." Sep. 11, 2007, pp. 1-6, XP002509616.

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

METHOD AND SYSTEM FOR CONTROLLING A CLOCK FREQUENCY IN A NETWORK DEVICE BASED ON AGGREGATE THROUGHPUT OF THE DEVICE

This patent application makes reference to, claims priority to and claims benefit from:
U.S. Provisional Patent Application Ser. No. 61/014,253 filed on Dec. 17, 2007;
U.S. Provisional Patent Application Ser. No. 61/014,265 filed on Dec. 17, 2007;
U.S. Provisional Patent Application Ser. No. 61/014,278 filed on Dec. 17, 2007; and
U.S. Provisional Patent Application Ser. No. 61/014,293 filed on Dec. 17, 2007.

This patent application also makes reference to:
U.S. patent application Ser. No. 12/200,402 filed on Aug. 28, 2008;
U.S. patent application Ser. No. 12/200,499 filed on Aug. 28, 2008; and
U.S. patent application Ser. No. 12/200,653 filed on Aug. 28, 2008.

Each of the above stated applications is hereby incorporated herein by reference in its entirety.

FIELD OF THE INVENTION

Certain embodiments of the invention relate to a method and system for networking. More specifically, certain embodiments of the invention relate to a method and system for controlling a clock frequency in a network device based on aggregate throughput of the device.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for controlling a clock frequency in a network device based on aggregate throughput of the device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for controlling a clock frequency in a network device based on aggregate throughput of the device. In various embodiments of the invention, for a network device comprising one or more network ports, a limit on aggregate throughput of the device during a time interval may be determined and an operating frequency of a clock within the network device may be controlled based on the determined limit on aggregate throughput of the device during the time interval. The limit on aggregate throughput of the device during the time interval may be determined based on past, present, and/or expected traffic patterns; how many of the device's network ports may be active during the time interval, a data rate at which each of the active network ports may operate during the time interval; a type of data that may be communicated via the network ports; and/or one or more applications running on the network device during the time interval. A maximum aggregate throughput supported by the network device may correspond to each of the one or more network ports operating at a maximum data rate. A maximum frequency of the clock may be determined based on the maximum aggregate throughput supported by the network device. Accordingly, the operating frequency of the clock may be controlled such that ratio of the operating frequency and the maximum clock frequency may be approximately equal to a ratio of the limit on aggregate throughput of the device during the time interval and the maximum aggregate throughput supported by the network device. The clock may be utilized by one or more hybrids, transmitters, receivers, processors, and/or memory elements within the network device. The operating frequency of the clock may be controlled based on latency requirements of data communicated to/from the network device.

Figure 1A:
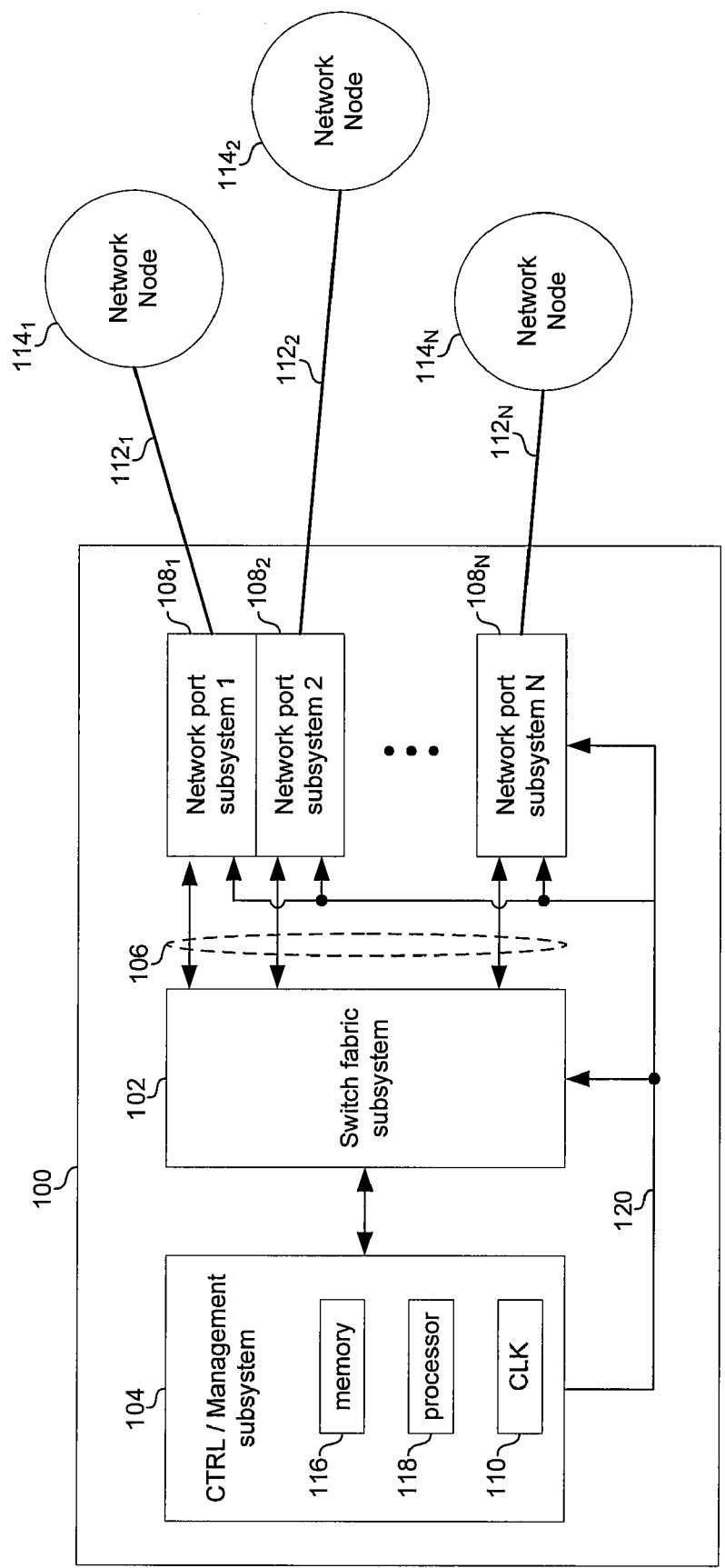
FIG. 1A is a block diagram illustrating an exemplary multi-port device communicatively coupled to a plurality of network devices, in accordance with an embodiment of the invention.

FIG. 1A is a block diagram illustrating a multi-port device communicatively coupled to a plurality of network devices, in accordance with an embodiment of the invention. Referring to FIG. 1A, there is shown an N-port device 100 communicatively coupled to devices 114$_1$, . . . , 114$_N$ (collectively referred to herein as devices 114) via links 112$_1$, . . . , 112$_N$ (collectively referred to herein as links 112). The N-port device 100 may comprise a control and management subsystem 104, a switch fabric subsystem 102, and a plurality of networking port subsystems 108$_1$, . . . , 108$_N$.

The control and management subsystem 104 may comprise suitable logic, circuitry, and/or code that may be operable to configure and/or control operations of the N-port device 100. In this regard, the control and management subsystem 104 may provide one or more control signals 120 to one or more portions of the switch fabric subsystem 102 and/or the network port subsystems 108$_1$, . . . , 108$_N$. Additionally, the control and management subsystem 104 may comprise suitable logic, circuitry, and/or code to enable operability of layer 3, and possibly higher layers, of the OSI model. For example, in instances that the device 100 may be an edge device such as a server or a PC, the control and management subsystem 104 may process data that may be communicated over one or more of the links 112. In an exemplary embodiment of the invention, the control and management subsystem 104 may comprise a processor 118, a memory 116, and a clock 110.

The processor 118 may comprise suitable logic, circuitry, and/or code that may enable processing data and/or controlling operations of the device 100. In this regard, the processor 118 may be enabled to provide control signals 120 to the various other blocks comprising the device 100. The processor 118 may also enable execution of applications programs and/or code. In various embodiments of the invention, the applications, programs, and/or code may enable, for example, configuring the switch fabric subsystem 102 and/or network port subsystems 108$_1$, . . . , 108$_N$. Additionally, in various embodiments of the invention, the applications, programs, and/or code may enable, for example, parsing or otherwise processing data.

The memory 116 may comprise suitable logic, circuitry, and/or code that may enable storage or programming of information that includes parameters and/or code that may effectuate the operation of the N-port device 100. The parameters may comprise configuration data and the code may comprise operational code such as software and/or firmware, but the information need not be limited in this regard. Moreover, the parameters may include adaptive filter and/or block coefficients.

The clock 110 may comprise suitable logic circuitry and/or code which may be operable to generate one or more reference signals for supporting operation of the N-port device 100. Although a single clock is illustrated in FIG. 1A, the invention is not so limited and the N-port device 100 may comprise a plurality of clocks. Additionally and/or alternatively, one or more derivative clocks may be generated from the clock 110 and may be utilized by one or more portions of the N-port device 100. Accordingly, aspects of the invention may be utilized to control one or more clocks and/or one or more derivatives thereof.

The switch fabric subsystem 102 may comprise suitable logic, circuitry, and/or code that may be operable to route data between the network port subsystems 108$_1$, . . . , 108$_N$. Additionally, in some instances, the switch fabric subsystem 102 may be operable to route data between one or more of the network port subsystems 108$_1$, . . . , 108$_N$ and the control management subsystem 104. In various embodiments of the invention, one or more portions of the switch fabric subsystem 102 may be dedicated to one of the network port subsystems 108$_1$, . . . , 108$_N$. In various embodiments of the invention, one or more portions of the switch fabric subsystem 102 may be shared among a plurality of the network port subsystems 108$_1$, . . . , 108$_N$. Additionally, various portions and/or resources of the switch fabric subsystem 102 may be dynamically allocated to one or more of the port subsystems 108$_1$, . . . , 108$_N$ as needed.

Each of the network port subsystems 108$_1$, . . . , 108$_N$ may comprise suitable logic, circuitry and/or code for communicating data between the switch fabric subsystem 104 and the physical links 112$_1$, . . . , 112$_N$. In this regard, the network port subsystems 108$_1$, . . . , 108$_N$ may each enable operability of layer 1, and in some instances layer 2 or higher, of the OSI model. In an exemplary embodiment of the invention, each of the network port subsystems 108$_1$, . . . , 108$_N$ may comprise, for example, a media access control (MAC) module and a PHY device. In an exemplary embodiment of the invention, the network port subsystems 108$_1$, . . . , 108$_N$ may communicate with the switch fabric subsystem 102 via an interface 106 which may, for example, be a PCI or PCI-X bus.

The links 112 may each comprise up to four or more physical channels and the devices 114 may communicate via two or more of the physical channels. For example, Ethernet over twisted pair standards 10BASE-T and 100BASE-TX may utilize two pairs of UTP while Ethernet over twisted pair standards 1000BASE-T and 10 GBASE-T may utilize four pairs of UTP.

In operation, a frequency of one or more clocks such as the clock 110 and/or derivatives of the clock 110 may be controlled based on aggregate throughput of the N-port device 100. Accordingly, one or more components or portions of the N-port device 100 may be operated at lower frequency when aggregate throughput of N-port device 100 may be low(er) and one or more components or portions of the N-port device 100 may be operated at a higher frequency when aggregate throughput of the N-port device 100 may be high(er). In this regard, aggregate throughput may refer to the sum of the data rates on the links 112$_1$, . . . , 112$_N$. The aggregate throughput of the N-port device 100 may depend, for example, on ingress and egress traffic to/from the N-port device 100. Accordingly, one or more clocks within the N-port device 100 may be controlled such that data processing capacity of the N-port device 100 may match (within a tolerance or range) the amount of data to be processed for transmission and/or reception via the links 112. For example, one or more processors/controllers, memory elements, transmitters, and/or receivers may be clocked at less than a maximum clock frequency during a time interval when less than a maximum amount of data may be transmitted and received via the links 112.

In various embodiments of the invention, one or more factors may place a lower bound on a frequency of one or more clocks such as the clock 110 and/or its derivatives. For example, there may be a minimum clock frequency which the N-port device 100 may operate at to prevent a need for retraining one or more of the network port subsystems 108$_i$, . . . , 108$_N$. Similarly, there may be a certain amount of processing overhead which a network device may perform and a minimum clock frequency may be determined based on the processing overhead. Also, constraints on a master clock may limit the frequency range of one or more clocks derived from the master clock.

In various exemplary embodiments of the invention, 'N' may be any integer greater than or equal to 1. For example, the device 100 may be VOIP phone and 'N' may be 3, the device 100 may be a SMB switch and 'N' may be 5, the device 100 may be an Enterprise switch and 'N' may be 48, or the device may be an aggregation switch and 'N' may be 96.

In various embodiments of the invention, the devices 114 may each comprise, for example, networking devices such as personal computers, wireless local area networking (WLAN) devices, voice over internet protocols (VOIP) devices, handheld devices, servers, switches, routers, and bridges. In various embodiments of the invention, the devices 114 may each comprise, for example, A/V equipment such as microphones, instruments, sound boards, sound cards, video cameras, media players, graphics cards, or other audio and/or video devices. Additionally, the devices 114 may each be enabled to utilize Audio/Video Bridging and/or Audio/video bridging extensions (collectively referred to herein as audio video bridging or AVB) for the exchange of multimedia content and associated control and/or auxiliary data.

In various embodiments of the invention, the N-port device 100 and/or devices 114 may each comprise suitable logic, circuitry, and/or code that may enable transmission and/or reception at a high(er) data in one direction and transmission and/or reception at a low(er) data rate in the other direction. Accordingly, a first clock frequency may be utilized for processing received data and a second clock frequency may be utilized for data to be transmitted.

In various embodiments of the invention, the N-port device 100 may be enabled to utilize Audio/Video Bridging and/or Audio/video bridging extensions (collectively referred to herein as audio video bridging or AVB) for the exchange of multimedia content and associated control and/or auxiliary data.

In various exemplary embodiments of the invention, one or more of the network port subsystems $108_1, \ldots, 108_N$ may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In an exemplary embodiment of the invention, one or more of the network port subsystems $108_1, \ldots, 108_N$ may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In an exemplary embodiment of the invention, one or more of the network port subsystems $108_1, \ldots, 108_N$ may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the link partners, one or more of the network port subsystems $108_1, \ldots, 108_N$ may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the N-port device 100.

In various embodiments of the invention, the device 100 may reside on one or more printed circuit boards. In this regard, one or more PCBs may be housed and/or communicatively coupled in a fixed or modular configuration. In regards to a modular, or "chassis", approach, the number and type of ports may be configurable.

Figure 1B:
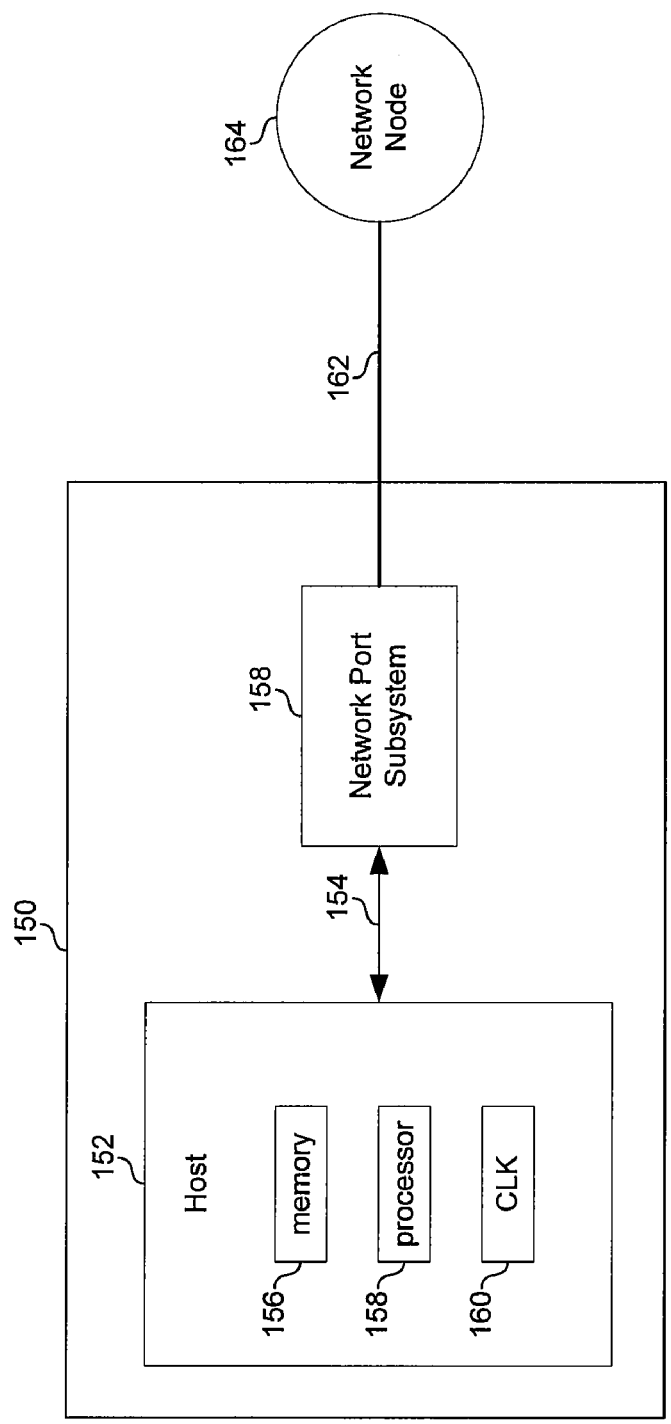
FIG. 1B is a block diagram illustrating an exemplary single-port device, in accordance with an embodiment of the invention.

FIG. 1B is a block diagram illustrating an exemplary single-port device, in accordance with an embodiment of the invention. Referring to FIG. 1B, the single-port device 150 may comprise a host 152 and a network port subsystem 158. The single-port 150 may be similar, or even the same in some cases, to the N-port device 100 described with respect to FIG. 1A. In this regard, the N-port device 100 may be more illustrative of a switch, bridge, router, or other device typically found in network core, whereas the single-port device 150 may be more illustrative of a device at the network edge such as a PC or a server.

The host 152 may comprise suitable logic, circuitry, and/or code that may be operable to enable operability of layer 2 and higher of the OSI model. Additionally, the host may comprise suitable logic, circuitry, and/or code that may be operable to perform any of a variety of computing and/or data processing functions. The host 152 may comprise a processor 158, a memory 156, and a clock 160 which may be similar to the processor 118, a memory 116, and the clock 110 described with respect to FIG. 1A.

The network port subsystem 158 may be similar to or the same as one of the network port subsystems $108_1, \ldots, 108_N$ described with respect to FIG. 1A.

The N-port device 100 of FIG. 1A may be primarily a networking device whereas networking may be a secondary function of the device 150. In this regard, the device 150 may utilize its network capabilities to facilitate a primary function which may comprise providing data and/or services to a user. However, even though networking may be a secondary function of the device 150, controlling one or more clock frequencies in the device 150 may still enable significantly reducing power consumption in the device 150. In this regard, one or more clocks within the device 150 associated with the network port subsystem 158 and/or associated with networking functions of the device 150 in general, may be slowed down. In this regard, reducing a clock frequency of portions of the network port subsystem 158 may provide a significant power savings. Additionally, portions of the host 152 associated with networking functions may also be clocked more slowly. For example, the network port subsystem 158 may communicate with the host 152 via bus 154 (e.g. 154) and traffic exchanged between the network port subsystem 158 and the host 152 may comprise a significant percentage of the transactions on the bus 154. Accordingly, in instances when less data may be communicated over the link 112, the bus 154 may correspondingly be clocked more slowly. Similarly, memory elements that may buffer data communicated between the network port subsystem 158 and the host 152 may be clocked more slowly when there may be less data to be communicated between the host 152 and the network port subsystem 158.

Figure 2A:
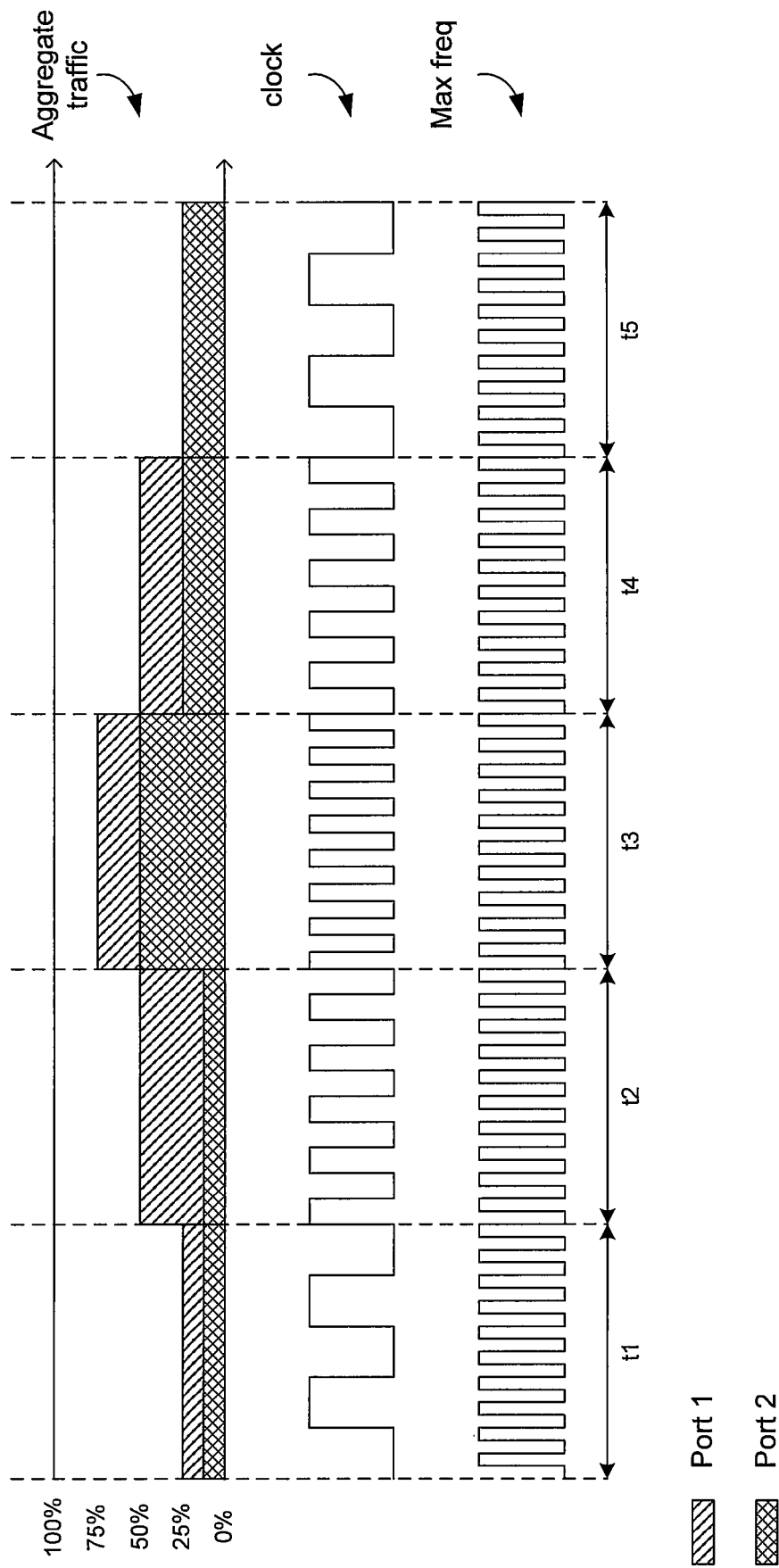
FIG. 2A is a diagram illustrating controlling a clock in a network device based on aggregate throughput of the device, in accordance with an embodiment of the invention.

FIG. 2A is a diagram illustrating controlling a clock in a network device based on aggregate throughput of the device, in accordance with an embodiment of the invention. Referring to FIG. 2A, in an exemplary embodiment of the invention, a device may have two ports and may need to process ingress and egress data for both ports. Consequently, to prevent corrupted or lost data, from overflowed or underflowed buffers, for example, the rate at which the device processes data, that is, the device's data processing capacity, may need to keep up with the combined ingress and egress data on the two ports. In this regard, an aggregate throughput of a device's network ports may be utilized to control a clock frequency in the device. The clock illustrated in FIG. 2A may be a clock utilized for networking functions of the device. For example, the clock of FIG. 2A may be a derivative clock generated from a master clock and a divide ratio utilized to generate the clock of FIG. 2A may be altered to control the frequency.

During the exemplary time interval t1, ports 1 and 2 may combine to support up to 25% of the maximum throughput supported by the network device. Accordingly, during time interval t1, the clock may be operated at 25% of its maximum frequency. During the exemplary time interval t2, ports 1 and 2 may combine to support up to 50% of the maximum throughput supported by the network device. Accordingly, during time interval t2, the clock may be operated at 50% of its maximum frequency. During the exemplary time interval t3, ports 1 and 2 may combine to support up to 75% of the maximum throughput of the network device. Accordingly, during time interval t3, the clock may be operated at 75% of its maximum frequency. During the exemplary time interval t4, ports 1 and 2 may combine to support up to 50% of the throughput of the network device. Accordingly, during time interval t4, the clock may be operated at 50% of its maximum frequency. During the exemplary time interval t5, ports 1 and 2 may combine to support up to 25% of the maximum throughput of the network device. Accordingly, during time interval t5, the clock may be operated at 25% of its maximum frequency.

Figure 2B:
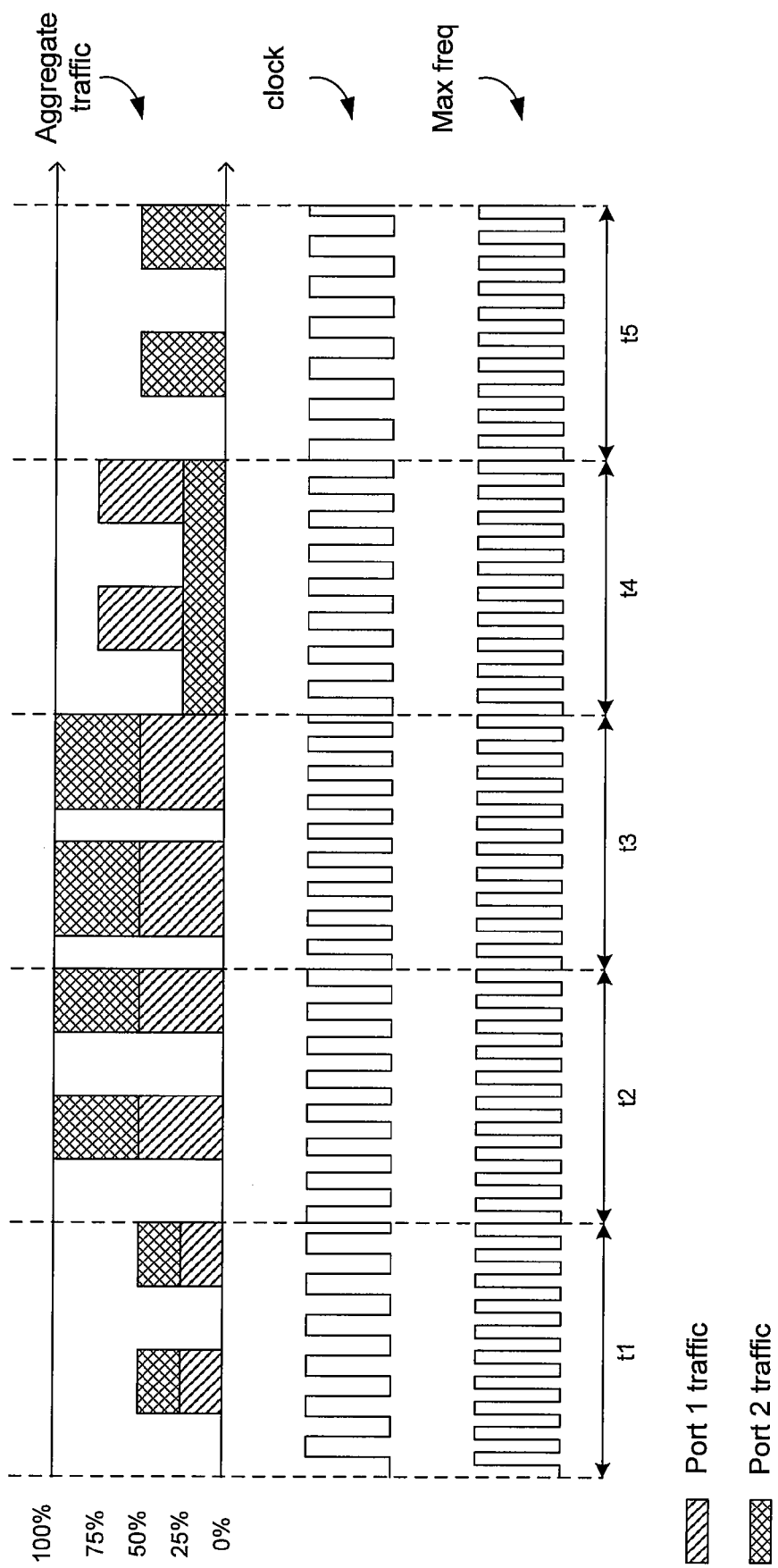
FIG. 2B is a diagram illustrating controlling a clock in a network device based on average aggregate throughput of the device during a time interval, in accordance with an embodiment of the invention.

FIG. 2B is a diagram illustrating controlling a clock in a network devices based on average aggregate throughput of the device, in accordance with an embodiment of the invention. Referring to FIG. 2B, in an exemplary embodiment of the invention, a device may have two ports and may need to process ingress and egress data for both ports. Consequently, to prevent corrupted or lost data, from overflowed or underflowed buffers, for example, the rate at which the device processes data, that is, the device's data processing capacity, may need to keep up with the combined ingress and egress data rate on the two ports. In the exemplary embodiment of the invention, the data rate of links to which ports 1 and 2 may be communicatively coupled may be duty cycled as described, for example, in the U.S. patent application Ser. No. 12/200,499 filed on Aug. 28, 2008 referenced above. In this regard, an aggregate throughput of a device's network ports may be utilized to control a clock frequency in the device. The clock illustrated in FIG. 2B may be a master clock utilized for multiple functions within the network device. Accordingly, only a percentage of the change in aggregate throughput of the device may be reflected in the change in clock frequency. For illustration, 50% of the master clock cycles may be allocated for networking functions and 50% of the master clock cycles may be utilized for other functions.

During the exemplary time interval t1, the average aggregate throughput supported by ports 1 and 2 may be up to 25% of the maximum throughput of the network device. Accordingly, during time interval t1, the clock may be operated at 62.5% of its maximum frequency, where 50% of the clock cycles may be allocated for non-networking functions and 12.5% of the clock cycles may be allocated for networking functions. During the exemplary time interval t2, the average aggregate throughput supported by ports 1 and 2 may be up to 50% of the maximum throughput of the network link. Accordingly, during time interval t2, the clock may be operated at 75% of its maximum frequency, where 50% of the clock cycles may be allocated for non-networking functions and 25% of the clock cycles may be allocated for networking functions. During the exemplary time interval t3, the average aggregate throughput supported by ports 1 and 2 may be up to 75% of the maximum throughput of the network device. Accordingly, during time interval t3, the clock may be operated at 87.5% of its maximum frequency, where 50% of the clock cycles may be allocated for non-networking functions and 37.5% of the clock cycles may be allocated for networking functions. During the exemplary time interval t4, the average aggregate throughput supported by ports 1 and 2 may be up to 50% of the maximum throughput of the network link. Accordingly, during time interval t4, the clock may be operated at 75% of its maximum frequency, where 50% of the clock cycles may be allocated for non-networking functions and 25% of the clock cycles may be allocated for networking functions. During the exemplary time interval t5, the average aggregate throughput supported by ports 1 and 2 may be up to 25% of the maximum throughput of the network device. Accordingly, during time interval t5, the clock may be operated at 62.5% of its maximum frequency, where 50% of the clock cycles may be allocated for non-networking functions and 12.5% of the clock cycles may be allocated for networking functions.

Figure 2C:
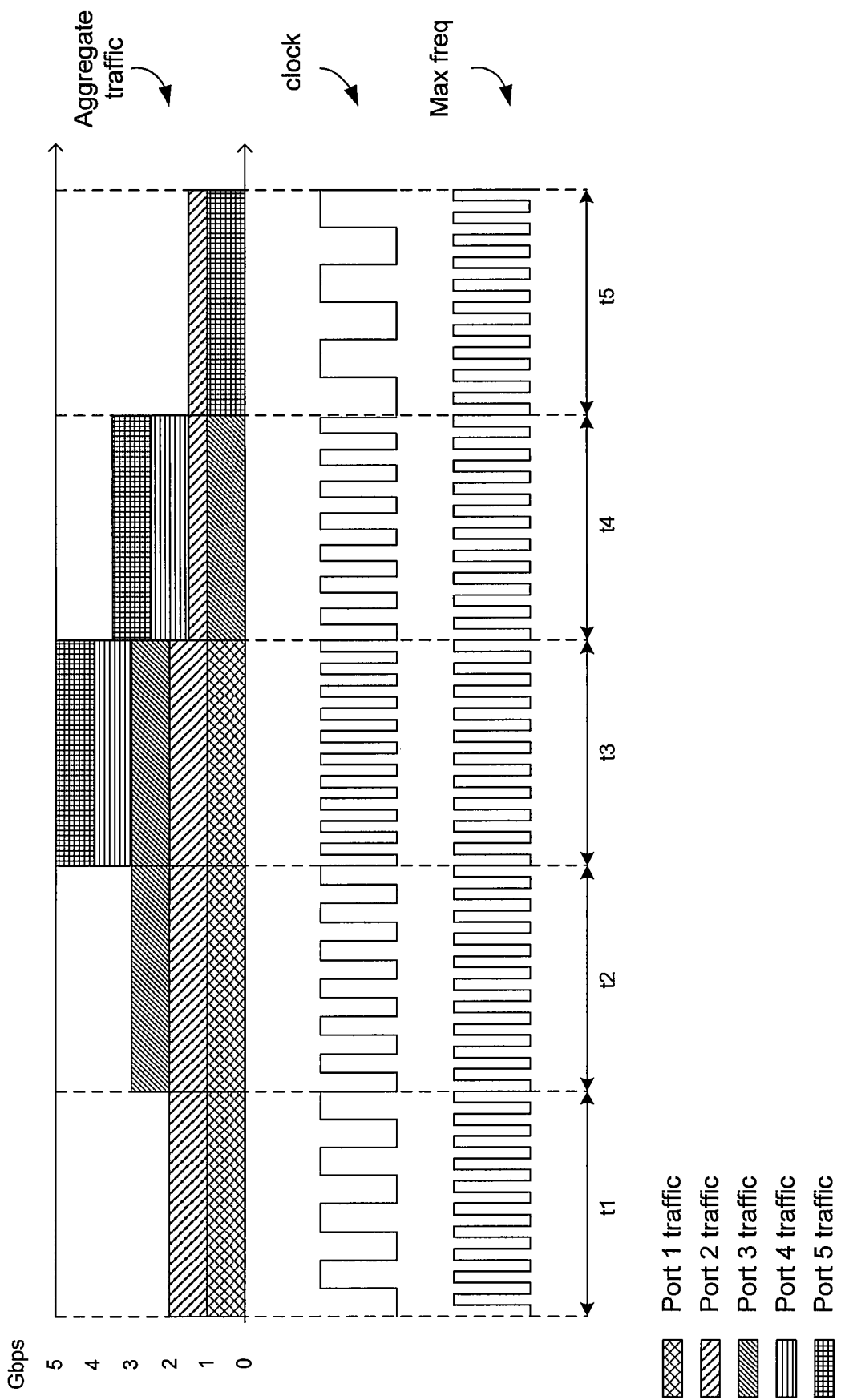
FIG. 2C is a diagram illustrating controlling a clock in a network device based on aggregate throughput of the device, in accordance with an embodiment of the invention.

FIG. 2C is a diagram illustrating controlling a clock in a network device based on aggregate throughput of the device, in accordance with an embodiment of the invention. Referring to FIG. 2C, in an exemplary embodiment of the invention, a device may comprise five ports which may each operate at 1 Gbps full-duplex or 500 Mbps full-duplex, where 500 Mbps may be a non-standard data rate supported by each of the five ports. In this regard, 1 Gbps and 500 Mbps are only exemplary data rates and the invention is not so limited. To prevent corrupted or lost data, from overflowed or underflowed buffers, for example, the rate at which the device processes data, that is, the device's data processing capacity, may need to keep up with the combined ingress and egress data on the five ports. In this regard, an aggregate throughput of a device's network ports may be utilized to control a clock frequency in the device. The clock illustrated in FIG. 2C may be a clock utilized for networking functions of the device. For example, the clock of FIG. 2C may be a derivative clock generated from a master clock and a divide ratio utilized to generate the clock may be altered to control the frequency.

During the exemplary time interval t1, ports 1 and 2 may be operating at 1 Gbps and ports 2-5 may be idle and possibly disconnected. Thus, the limit on aggregate throughput of the device during time interval t1 may be 2 Gbps. Accordingly, during time interval t1, the clock may be operated at 40% of its maximum frequency. During the exemplary time interval t2, ports 1-3 may be operating at 1 Gbps and ports 4 and 5 may be idle and possibly disconnected. Thus, the limit on aggregate throughput of the device during time interval t2 may be 3 Gbps. Accordingly, during time interval t2, the clock may be operated at 60% of its maximum frequency. During the exemplary time interval t3, ports 1-5 may be operating at 1 Gbps. Thus, the limit on aggregate throughput of the device during time interval t3 may be 5 Gbps. Accordingly, during time interval t3, the clock may be operated at 100% of its maximum frequency. During the exemplary time interval t4, ports 1, 4 and 5 may be operating at 1 Gbps and port 2 may be operating at 500 Mbps, which may be a non-standard data rate supported by the device. Thus, the limit on aggregate throughput of the device during time interval t3 may be 3.5 Gbps. Accordingly, during time interval t4, the clock may be operated at 70% of its maximum frequency. During the exemplary time interval t5, port 5 may be operating at 1 Gbps, port 2 may be operating at 500 Mbps, and ports 1, 3, and 4 may be idle and possibly disconnected. Thus, the limit on aggregate throughput of the device during time interval t3 may be 1.5

Gbps. Accordingly, during time interval t5, the clock may be operated at 30% of its maximum frequency.

Figure 2D:
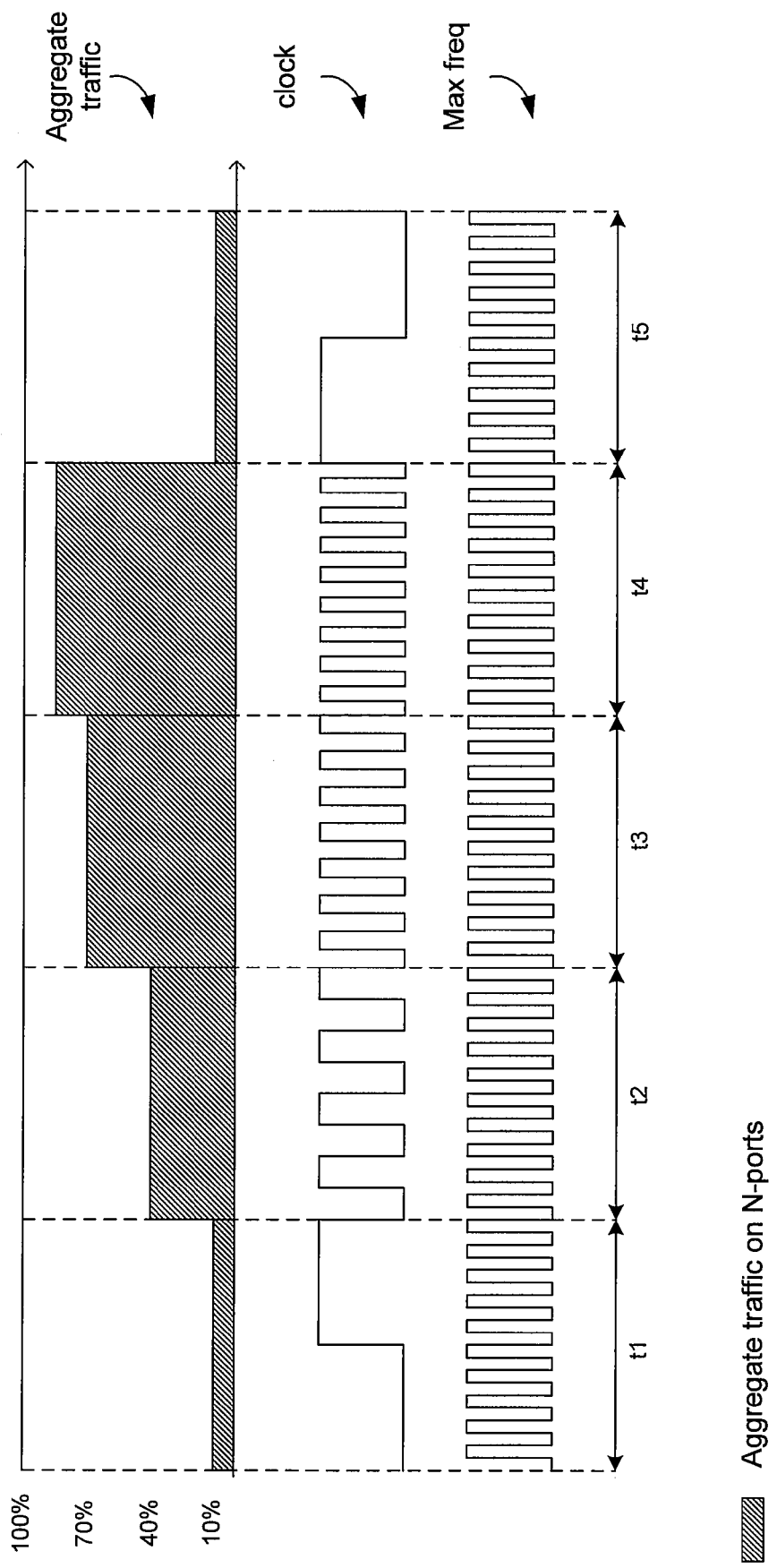
FIG. 2D is a diagram illustrating controlling a clock in a network device based on aggregate throughput of the device, in accordance with an embodiment of the invention.

FIG. 2D is a diagram illustrating controlling a clock in a network device based on aggregate throughput of the device, in accordance with an embodiment of the invention. Referring to FIG. 2D, in an exemplary embodiment of the invention, a device may comprise N ports which may each support a plurality of standard and/or non-standard data rates. To prevent corrupted or lost data, from overflowed or underflowed buffers, for example, the rate at which the device processes data, that is, the device's data processing capacity, may need to keep up with the combined ingress and egress data on the N ports. In this regard, an aggregate throughput of a device's network ports may be utilized to control a clock frequency in the device. The clock illustrated in FIG. 2D may be a clock utilized for networking functions of the device. For example, the clock of FIG. 2D may be a derivative clock generated from a master clock and a divide ratio utilized to generate the clock may be altered to control the frequency.

During the exemplary time interval t1, ports 1 through N may combine to support up to 10% of the maximum throughput supported by the network device. Accordingly, during time interval t1, the clock may be operated at 10% of its maximum frequency. During the exemplary time interval t2, ports 1 through N may combine to support up to 40% of the maximum throughput supported by the network device. Accordingly, during time interval t2, the clock may be operated at 40% of its maximum frequency. During the exemplary time interval t3, ports 1 through N may combine to support up to 70% of the maximum throughput supported by the network device. Accordingly, during time interval t3, the clock may be operated at 70% of its maximum frequency. During the exemplary time interval t4, ports 1 through N may combine to support up to 85% of the maximum throughput supported by the network device. Accordingly, during time interval t4, the clock may be operated at 85% of its maximum frequency. During the exemplary time interval t5, ports 1 through N may combine to support up to 10% of the maximum throughput supported by the network device. Accordingly, during time interval t5, the clock may be operated at 10% of its maximum frequency.

Figure 3:
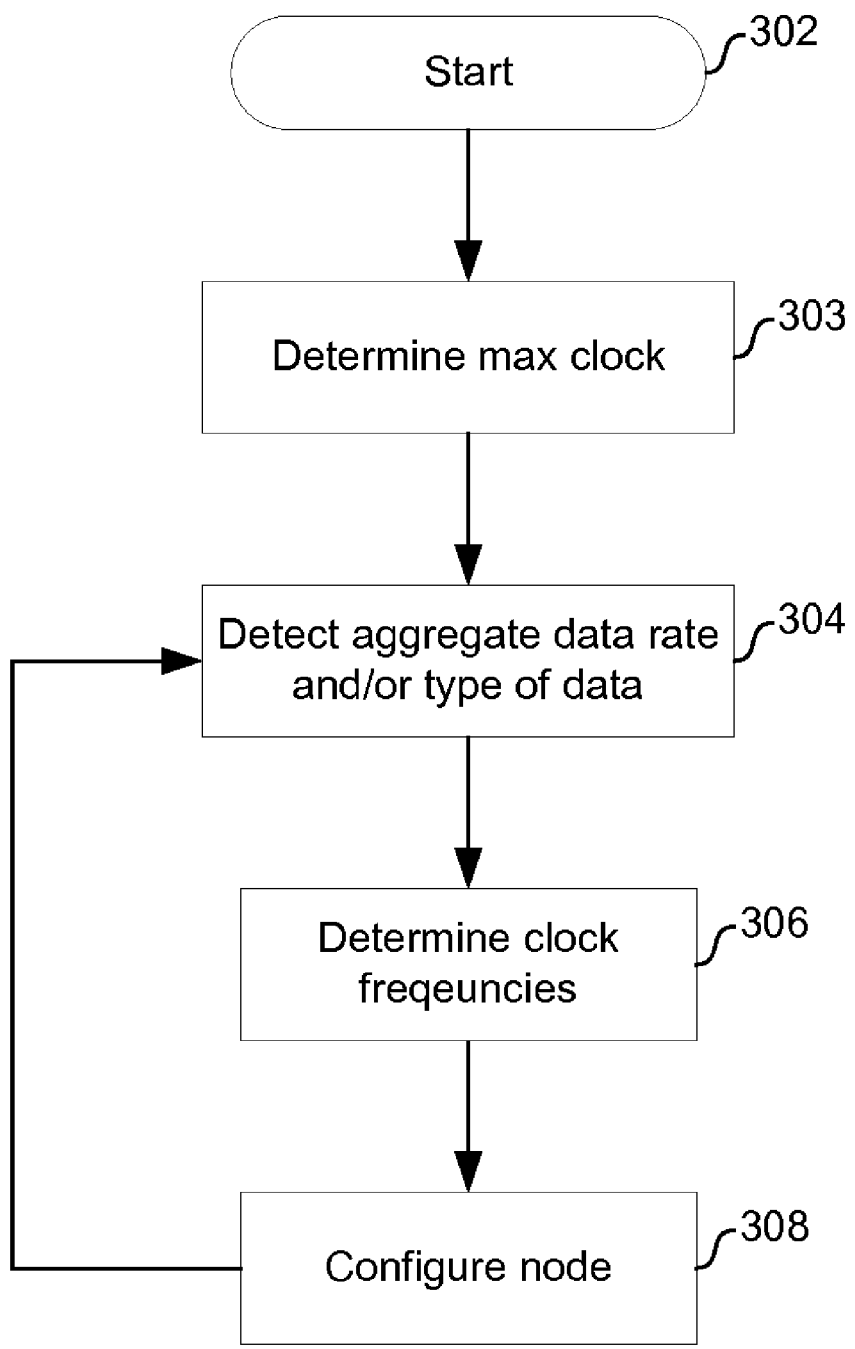
FIG. 3 is a flow chart illustrating exemplary steps for controlling clock frequency in a network device based on aggregate throughput of the device, in accordance with an embodiment of the invention.

FIG. 3 is a flow chart illustrating exemplary steps for controlling clock frequency in a network device based on aggregate throughput of the device, in accordance with an embodiment of the invention. For illustration, the exemplary steps are described with reference to the N-port device 100 described with respect to FIG. 1A. Referring to FIG. 3, subsequent to start step 302 the exemplary steps may advance to step 303.

In step 303, a maximum frequency of one or more clocks in the network device 100 may be determined. In this regard, the maximum clock frequency may be determined such that the device may be operable to handle a maximum data rate on every link to which the device may be communicatively coupled. In an exemplary embodiment of the invention, the maximum clock frequency may be determined programmatically, possibly in real-time, via logic, circuitry, and/or code. In another exemplary embodiment of the invention, the maximum clock frequency may be configured by a system administrator. Subsequent to step 303, the exemplary steps may advance to step 304.

In step 304, the device 100 may determine a limit on aggregate throughput of the device 100 during a time interval T. In this regard, the limit on aggregate throughput of the device 100 during the time interval T may be less than or equal to a maximum aggregate throughput supported by the device 100. In various embodiments of the invention, the limit on aggregate throughput of the device 100 during the time interval T may be determined based on which of the N ports may be active during the time interval T. In this regard, a port may be inactive when there may be no data to be communicated via the port and/or when the port may not be attached to a physical media (e.g. cable). In various embodiments of the invention, the limit on aggregate throughput of the device 100 during the time interval T may be determined based on the data rate at which one or more of the N ports may operate during the time interval T. In this regard, the data rate may be limited due to power requirements and/or a desire to conserve energy. Accordingly, one or more techniques referred to as "Energy Efficient Ethernet" may be utilized to manage power consumption of the device 100 and may result in communications at less than a maximum supported data rate. For example, various variations of "low power IDLE" and/or "subset PHY" may be utilized. In various embodiments of the invention, the limit on aggregate throughput of the device 100 during the time interval T may be determined based on, for example, a type of data communicated and/or known and/or predicted traffic patterns on one or more of the N network ports during the time interval T. Subsequent to step 304, the exemplary steps may advance to step 306.

In step 306, one or more frequencies for one or more clocks in the device 100 may be determined based on the limit on aggregate throughput of the device 100 during the time interval T determined in step 304 and/or the capacity of one or more memory elements utilized to buffer ingress and egress traffic at the device 100. In this regard, one or more clock frequencies may be determined so as to prevent overflowing and/or underflowing buffers. For example, the ratio of the determined clock frequency and a maximum clock frequency may be chosen to be the same as the ratio of the limit on aggregate throughput of the device 100 during the time interval T and the maximum aggregate throughput supported by the device. For example, the device may comprise five ports which may each be enabled to operate at 10/100/1000 Mbps. Thus, the maximum aggregate throughput supported by the device may be 5000 Mbps. Accordingly, a maximum clock frequency may correspond to an aggregate throughput of 5000 Mbps and the clock frequency may be reduced from the maximum frequency in instances that one or more of the ports are below 1000 Mbps. For example, three of the ports may be disconnected, one port may operate at 1000 Mbps and one port may operate a 10 Mbps. Consequently, the limit on aggregate throughput of the device 100 during the time interval T may be 1010 Mbps and the clock frequency may be scaled down to 1010/5000 or approximately ⅕ of the maximum clock frequency. In some embodiments of the invention, one or more clock frequencies may be determined based on the type of data being communicated on the links 112. In this regard, the one or more clock frequencies may have an affect on how much data is buffered, and thus latency requirements of certain data may be considered. Subsequent to step 306, the exemplary steps may advance to step 308.

In step 308, one or more clocks within the network device may be configured based on the one or more frequencies determined in step 306. In order to prevent lost and/or corrupted data, a time instant at which to implement the new clock frequency may be determined. Subsequent to step 308, the exemplary steps may return to step 304 and operate utilizing the new clock frequency or frequencies determined in step 306 until the completion of time interval T.

Aspects of a method and system for controlling a clock frequency in a network device based on aggregate throughput of the device are provided. In an exemplary embodiment of the invention, for a network device 100 comprising one or more network ports 108, a limit on aggregate throughput of the device 100 during a time interval may be determined and an operating frequency of a clock 110 within the network device may be controlled based on the determined limit on aggregate throughput of the device 100 during the time interval. The limit on aggregate throughput of the device 100 during the time interval may be determined based on past, present, and/or expected traffic patterns; how many of the device's network ports 108 may be active during the time interval, a data rate at which each of the active network ports 108 may operate during the time interval; a type of data that may be communicated via the network ports 108; and/or one or more applications running on the network device 100 during the time interval. A maximum aggregate throughput supported by the network device 100 may correspond to each of the one or more network ports 108 operating at a maximum data rate. A maximum frequency of the clock 110 may be determined based on the maximum aggregate throughput supported by the network device 100. Accordingly, the operating frequency of the clock 110 may be controlled such that ratio of the operating frequency and the maximum clock frequency may be approximately equal to a ratio of the limit on aggregate throughput of the device 100 during the time interval and the maximum aggregate throughput supported by the network device 100. The clock 110 may be utilized by one or more hybrids, transmitters, receivers, processors, and/or memory elements within the network device. The operating frequency of the clock 110 may be controlled based on latency requirements of data communicated to/from the network device. In some embodiments of the invention, the device 100 may communicate utilizing Ethernet protocols. Additionally, power consumption of the device 100 may be managed utilizing one or more Energy Efficient Ethernet techniques such as low power idle and/or subset PHY.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for controlling a clock frequency in a network device based on aggregate throughput of the device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   for a network device comprising a plurality of network ports, selecting, during a time interval, a data rate for each of said plurality of network ports;
   determining a limit on an aggregate throughput for said network device by adding each said selected data rate to a sum, said sum corresponding to said limit on said aggregate throughput; and
   responsive to said determined limit on aggregate throughput, controlling an operating frequency of a clock within said network device such that a ratio of said operating frequency and a maximum frequency of said clock is approximately equal to a ratio of said limit on said aggregate throughput and a maximum aggregate throughput supported by said network device, wherein said clock is utilized for processing ingress and/or egress data for said each of said plurality of network ports.

2. The method according to claim 1, wherein, for each one of said plurality of network ports, said selected data rate is selected based on past, present, and/or expected traffic patterns on said one of said plurality of network ports.

3. The method according to claim 1, wherein a selected data rate for one or more of said plurality of network ports is a zero data rate, such that said one or more of said plurality of network ports are active during said time interval.

4. The method according to claim 3, wherein a data rate of each active one of said plurality of network ports is selected from 10 Mbps, 100 Mbps, 1 Gbps, and 10 Gbps.

5. The method according to claim 1, wherein said selected data rate for each one of said plurality of network ports is selected based, at least in part, on a type of said ingress and/or egress data communicated via said one of said plurality of network ports.

6. The method according to claim 1, wherein, for each of said plurality of network ports, said selected data rate is selected based, at least in part, on one or more applications running on said network device during said time interval.

7. The method according to claim 1, wherein said clock is utilized by one or more hybrids, transmitters, receivers, processors, and memory elements within said network device.

8. The method according to claim 1, wherein said maximum aggregate throughput supported by said network device corresponds to each of said plurality of network ports operating at a maximum data rate.

9. The method according to claim 1, wherein said maximum frequency of said clock is determined based on said maximum aggregate throughput supported by said network device.

10. The method according to claim 1, comprising controlling said operating frequency of said clock based on latency requirements of said ingress and/or egress data.

11. The method according to claim 1, comprising communicating, by said network device, via said plurality of network ports utilizing Ethernet protocols.

12. The method according to claim 1, comprising managing power consumption of said network device by utilizing one or more Energy Efficient Ethernet techniques.

13. A system for networking, the system comprising:
one or more circuits in a network device comprising a plurality network ports, wherein said one or more circuits are operable to:
select, during a time interval, a data rate for each of said plurality of network ports;
determine a limit on an aggregate throughput for said network device by adding each said selected data rate to a sum, said sum corresponding to said limit on said aggregate throughput; and
responsive to said determined limit on said aggregate throughput, control an operating frequency of a clock within said network device such that a ratio of said operating frequency and said maximum frequency is approximately equal to a ratio of said limit on said aggregate throughput and a maximum aggregate throughput supported by said network device, wherein said clock is utilized for processing ingress and/or egress data for said each of said plurality network ports.

14. The system according to claim 13, wherein, for each one of said plurality of network ports, said selected data rate is selected based on past, present, and/or expected traffic patterns on said one of said plurality of network ports.

15. The system according to claim 13, wherein a selected data rate for one or more of said plurality of network ports is a zero data rate, such that said one or more of said plurality of network ports are active during said time interval.

16. The system according to claim 15, wherein a data rate of each active one of said plurality of network ports is selected from 10 Mbps, 100 Mbps, 1 Gbps, and 10 Gbps.

17. The system according to claim 13, wherein said selected data rate for said each one of said plurality of network ports is selected based, at least in part, on a type of said ingress and/or egress data communicated via said one of said plurality of network ports.

18. The system according to claim 13, wherein, for each of said plurality of network ports, said selected data rate is selected based, at least in part, on one or more applications running on said network device during said time interval.

19. The system according to claim 13, wherein said clock is utilized by one or more hybrids, transmitters, receivers, processors, and memory elements within said network device.

20. The system according to claim 13, wherein said maximum aggregate throughput supported by said network device corresponds to each of said plurality of network ports operating at a maximum data rate.

21. The system according to claim 13, wherein said maximum frequency of said clock is determined based on said maximum aggregate throughput supported by said network device.

22. The system according to claim 13, wherein said one or more circuits are operable to control said operating frequency of said clock based on latency requirements of said ingress and/or egress data.

23. The system according to claim 13, wherein said network device is operable to communicate via said plurality of network ports utilizing Ethernet protocols.

24. The system according to claim 13, wherein said network device is operable to manage power consumption utilizing one or more Energy Efficient Ethernet techniques.

25. A method for networking, the method comprising:
for a network device comprising one or more network ports, determining a limit on aggregate throughput of said network device during a time interval;
responsive to said determined limit on aggregate throughput, controlling an operating frequency of a clock within said network device wherein said clock is utilized for processing ingress and/or egress data of said one or more network ports; and
controlling said operating frequency such that a ratio of said operating frequency and a maximum frequency of said clock is approximately equal to a ratio of said limit on said aggregate throughput and a maximum aggregate throughput supported by said network device.

26. The method according to claim 25, comprising determining said limit on said aggregate throughput based on past, present, and/or expected traffic patterns on said one or more network ports.

27. The method according to claim 25, comprising determining said limit on said aggregate throughput based on how many of said one or more network ports are active during said time interval.

28. The method according to claim 27, comprising determining said limit on said aggregate throughput based on a data rate at which each of said active network ports operates during said time interval.

29. The method according to claim 25, comprising determining said limit on said aggregate throughput based, at least in part, on a type of said ingress and/or egress data.

30. The method according to claim 25, comprising determining said limit on said aggregate throughput, at least in part, on one or more applications running on said network device during said time interval.

31. The method according to claim 25, wherein said clock is utilized by one or more hybrids, transmitters, receivers, processors, and memory elements within said network device.

32. The method according to claim 25, comprising controlling said operating frequency of said clock based on latency requirements of said ingress and/or egress data.

33. The method according to claim 25, comprising communicating, by said network device, via said one or more network ports utilizing Ethernet protocols.

34. The method according to claim 25, comprising managing power consumption of said network device by utilizing one or more Energy Efficient Ethernet techniques.

35. A method for networking, the method comprising:
for a network device comprising one or more network ports:
determining a limit on aggregate throughput of said network device during a time interval;
responsive to said determined limit on aggregate throughput, controlling an operating frequency of a clock within said network device wherein said clock is utilized for processing ingress and/or egress data of said one or more network ports; and
controlling said operating frequency such that a ratio of said operating frequency and a maximum frequency of said clock is approximately equal to a ratio of said limit on said aggregate throughput and a maximum aggregate throughput supported by said network device, wherein said maximum aggregate throughput supported by said network device corresponds to each of said one or more network ports operating at a maximum data rate.

36. A method for networking, the method comprising:
for a network device comprising one or more network ports:
determining a limit on aggregate throughput of said network device during a time interval;

responsive to said determined limit on aggregate throughput, controlling an operating frequency of a clock within said network device wherein said clock is utilized for processing ingress and/or egress data of said one or more network ports; and controlling said operating frequency such that a ratio of said operating frequency and a maximum frequency of said clock is approximately equal to a ratio of said limit on said aggregate throughput and a maximum aggregate throughput supported by said network device, wherein said maximum frequency of said clock is determined based on said maximum aggregate throughput supported by said network device.

37. A system for networking, the system comprising:
one or more circuits in a network device comprising one or more network ports, wherein said one or more circuits are operable to:
determine a limit on aggregate throughput of said network device during a time interval;
responsive to said determined limit on said aggregate throughput, control an operating frequency of a clock within said network device wherein said clock is utilized for processing ingress and/or egress data of said one or more network ports; and
control said operating frequency such that a ratio of said operating frequency and said maximum frequency of said clock is approximately equal to a ratio of said limit on said aggregate throughput and a maximum aggregate throughput supported by said network device.

38. The system according to claim 37, wherein said one or more circuits are operable to determine said limit on said aggregate throughput based on past, present, and/or expected traffic patterns on said one or more network ports.

39. The system according to claim 37, wherein said one or more circuits are operable to determine said limit on said aggregate throughput based on how many of said one or more network ports are active during said time interval.

40. The system according to claim 39, wherein said one or more circuits are operable to determine said limit on said aggregate throughput based on a data rate at which each of said active network ports operates during said time interval.

41. The system according to claim 37, wherein said one or more circuits are operable to determine said limit on said aggregate throughput based, at least in part, on a type of said ingress and/or egress data.

42. The system according to claim 37, wherein said one or more circuits are operable to determine said limit on said aggregate throughput based, at least in part, on one or more applications running on said network device during said time interval.

43. The system according to claim 37, wherein said clock is utilized by one or more hybrids, transmitters, receivers, processors, and memory elements within said network device.

44. The system according to claim 37, wherein said one or more circuits are operable to control said operating frequency of said clock based on latency requirements of said ingress and/or egress data.

45. The system according to claim 37, wherein said network device is operable to communicate via said one or more network ports utilizing Ethernet protocols.

46. The system according to claim 37, wherein said network device is operable to manage power consumption utilizing one or more Energy Efficient Ethernet techniques.

47. A system for networking, the system comprising:
one or more circuits in a network device comprising one or more network ports, wherein said one or more circuits are operable to:
determine a limit on aggregate throughput of said network device during a time interval;
responsive to said determined limit on said aggregate throughput, control an operating frequency of a clock within said network device wherein said clock is utilized for processing ingress and/or egress data of said one or more network ports; and
control said operating frequency such that a ratio of said operating frequency and said maximum frequency of said clock is approximately equal to a ratio of said limit on said aggregate throughput and a maximum aggregate throughput supported by said network device, wherein said maximum aggregate throughput supported by said network device corresponds to each of said one or more network ports operating at a maximum data rate.

48. A system for networking, the system comprising:
one or more circuits in a network device comprising one or more network ports, wherein said one or more circuits are operable to:
determine a limit on aggregate throughput of said network device during a time interval;
responsive to said determined limit on said aggregate throughput, control an operating frequency of a clock within said network device wherein said clock is utilized for processing ingress and/or egress data of said one or more network ports; and
control said operating frequency such that a ratio of said operating frequency and said maximum frequency of said clock is approximately equal to a ratio of said limit on said aggregate throughput and a maximum aggregate throughput supported by said network device, wherein said maximum frequency of said clock is determined based on said maximum aggregate throughput supported by said network device.

* * * * *